United States Patent [19]

Forseth

[11] 4,274,364
[45] Jun. 23, 1981

[54] INCUBATION METHOD

[75] Inventor: Dean A. Forseth, Corvallis, Oreg.

[73] Assignee: Hensway, Inc., Corvallis, Oreg.

[21] Appl. No.: 107,497

[22] Filed: Dec. 26, 1979

[51] Int. Cl.³ .................... A01K 41/00; A01K 41/04
[52] U.S. Cl. ........................................ 119/35; 119/37
[58] Field of Search ................. 119/35, 37, 39, 41, 119/38, 44; 236/2, 3, 4

[56] References Cited

U.S. PATENT DOCUMENTS

| 1,722,214 | 7/1929 | Hillpot | 119/44 |
|---|---|---|---|
| 1,918,585 | 7/1933 | Biggins | 119/37 |
| 2,281,339 | 4/1942 | Taggart | 119/37 |
| 2,439,719 | 4/1948 | Crawford | 119/41 |
| 2,706,915 | 4/1955 | Rosenberg | 74/425 |
| 2,793,581 | 5/1957 | Cannon | 119/44 X |
| 3,006,320 | 10/1961 | Bailey | 119/37 |
| 3,750,627 | 8/1973 | MacKinnon | 119/44 |

Primary Examiner—Hugh R. Chamblee
Attorney, Agent, or Firm—Kolisch, Hartwell & Dickinson

[57] ABSTRACT

Method and apparatus for incubating eggs. Eggs during the incubation cycle are supported on means which senses the weight of the eggs whereby dry-down in the eggs may be monitored. Relative humidity adjustments are made within the incubator pursuant to measurements made by the weight-sensing means promoting a dry-down conforming to a targeted dry-down.

7 Claims, 8 Drawing Figures

INCUBATION METHOD

BACKGROUND AND SUMMARY OF THE INVENTION

This invention relates to method and apparatus for incubating eggs. More particularly, it concerns such a method and apparatus which includes a weight-sensing means which senses the weight of a batch of eggs subjected to incubation, and wherein provision is made for using this information to control the atmospheric conditions under which the eggs are being incubated in a manner which produces an optimum egg hatch.

Observations which have been performed on the incubation cycle of avian eggs indicate that the eggs experience a weight loss during the incubation period which is primarily due to loss of water from the eggs through diffusion of the water through the pores existing in the usual egg shell into the surrounding environment. This loss of water is sometimes referred to as the "dry-down" which occurs in the egg during incubation. The rate of dry-down, and the total amount which occurs during incubation, it has been discovered, may be controlled by controlling the atmospheric conditions which surround the eggs during the incubating period.

More specifically, it has been observed that where the dry-down in the egg is too fast or exceeds the optimum amount (which with the usual turkey egg is in the neighborhood of 13.5%), weak dehydrated embryos result. Where the dry-down is at too slow a rate, or total dry-down is less than the optimum, the air sac which normally forms within the egg shell is too small, tending to cause drowning of the embryo due to lack of the air sac needed for internal breathing. In both instances, so-called pipping may be interfered with, pipping referring to the act of an emerging embryo breaking the egg shell that surrounds it and becoming a hatched chick.

What the instant invention more specifically contemplates is controlling the atmosphere which surrounds the eggs, more specifically the relative humidity of the atmosphere, whereby dry-down during the incubation cycle tends to proceed along a targeted rate, and the dry-down at the end of the cycle is at the level considered optimum for chick production. These ends are achieved according to the instant invention by periodically monitoring the weight of the eggs subjected to the incubation cycle, whereby in effect the weight loss in the average egg is made known, and utilizing this information to make adjustments in the relative humidity in the atmosphere surrounding the eggs to increase or decrease the rate of dry-down, as may be desirable in any particular case.

A general object of the invention, therefore, is to provide an improved method for incubating eggs which relys on monitoring egg weight for the purpose of controlling the conditions of the atmosphere which surrounds the eggs during the incubation cycle or period.

Another object is to provide improved apparatus for incubating eggs, featuring weight-sensing means which senses the weight of the eggs during the incubation cycle, and means responsive to this weight-sensing means controlling the conditions of the atmosphere surrounding the eggs.

More specifically, as a further object of the invention it is contemplated that a batch of eggs be subjected to the incubation period in a single stage type of incubation, which means that all the eggs in the batch progress through the incubation cycle at the same stage. Periodically, weight measurements are made of these eggs to determine the dry-down which has occurred in these eggs. The rate of dry-down is then compared to a targeted dry-down rate, and a humidity adjustment made when a variance from targeted dry-down is noted, which tends to correct the variance.

Yet another object of the invention is to provide an incubation facility which includes an incubating chamber, means for holding incubating egg trays within this chamber which includes weight-sensing means constructed and arranged to produce a measurement indicative of the weight of the eggs carried by the trays, and means for adjusting the relative humidity of the chamber responsive to the measurements produced by this weight-sensing means.

These and other objects and advantages are attained by the invention, which is described hereinbelow in conjunction with the accompanying drawings, wherein:

DETAILED DESCRIPTION OF THE INVENTION

It is conventional to subject turkey eggs to a 25 day incubation period or cycle, whence the eggs are transferred to a hatching area and subjected to a three day hatching period which terminates with hatching of young poults. Chicken eggs are subjected to an 18 day incubation period, followed by a three day hatching period to produce young chicks. As briefly described above, observations have been made indicating that optimum egg hatching results are obtained if the dry-down that has occurred in the egg during the incubation period is at a certain predetermined level. Furthermore, it has been observed that a better hatch results if the rate of dry-down which occurs during the incubation period follows a preselected pattern. With turkey eggs, if the dry-down in the eggs at the end of the 25 day incubation period is approximately 13.5%, and if the rate of dry-down in the eggs during this incubation period is maintained at approximately a uniform rate, an increase in the hatch of the eggs subjected to incubation of 3% or more is experienced, over what would be expected using conventional methods. This, of course, is a significant figure which can contribute substantially to the profits of a hatchery. Furthermore, stronger and healthier poults or chicks are produced.

Figure 4:
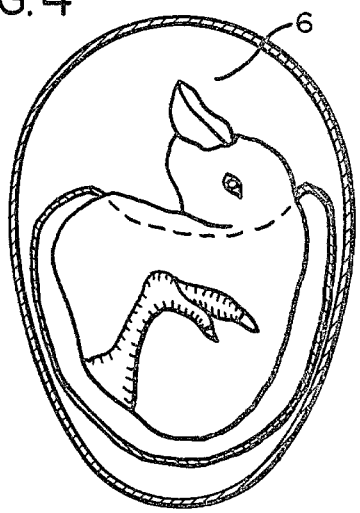
FIGS. 4, 5 and 6 are figures showing the interior of an egg after the incubation cycle and near the end of the hatching period that follows the incubation cycle, FIG. 4 showing the embryo as such appears when dry-down has been excessive, FIG. 5 showing the embryo as such appears when there has been too little dry-down, and FIG. 6 showing the embryo as such appears with optimum dry-down having occurred.

In FIG. 4, there is illustrated a chicken embryo after 18 days of incubation and one day into the hatching period, where excessive dry-down occurred during the incubation period. The air sac 6 at the large end of the egg is overly large. Because of excessive loss of water, dehydration of the egg membrane occurs, making it dry and tough. The chicken embryo itself is weakened, and has difficulty in pipping, in that it cannot break the membrane and shell.

Figure 5:
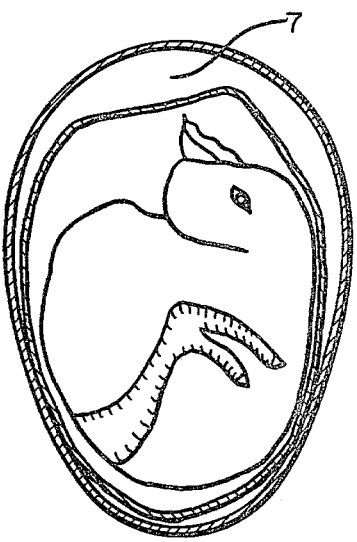

FIG. 5 illustrates a chicken embryo after 19 days of incubation where there has not been enough dry-down. The embryo is unable to enter the air sac 7 at the large end of the egg, and drowning of the embryo occurs.

Figure 6:
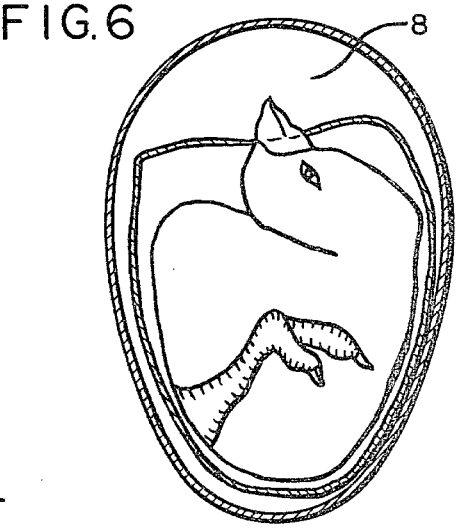

In FIG. 6 there is illustrated a chicken in a shell after 19 days of incubation where correct dry-down has occurred. The air sac 8 present is sufficient for internal breathing but the dehydration which has occurred is not so great as to weaken the embryo or overly toughen the egg membrane.

Figure 1:
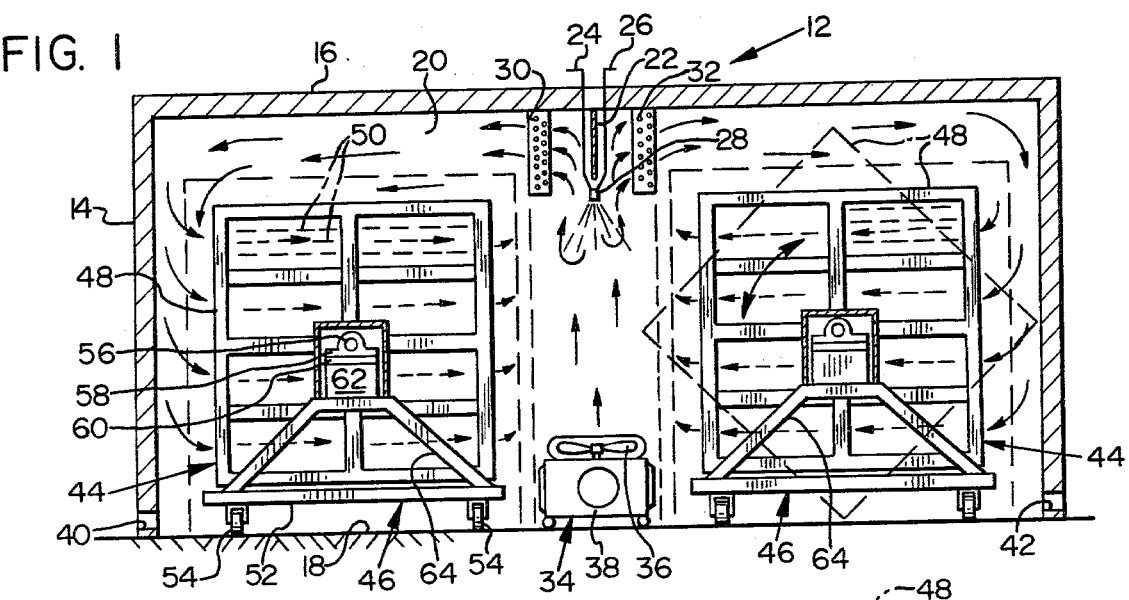
FIG. 1 is a side elevation of an incubating facility as contemplated herein, the side wall of the chamber in this facility which faces the viewer having been removed to illustrate details within the incubating chamber.

An incubation facility such as may be used in the incubating of eggs is illustrated in FIG. 1. Referring to the figure, such comprises side walls 14, a ceiling 16 and a floor 18 defining an incubating chamber 20. The side wall nearest the viewer in FIG. 1 has been removed but it should be understood that such side wall includes doors to enable access to the chamber and the moving in and out of eggs at the start and end of the incubation period.

Within the incubation chamber and extending between the front and rear of the chamber as such is portrayed in FIG. 1 is a divider 22. Air and water lines 24, 26 connect with an atomizer 28 at the base of the divider. With operation of the atomizer, a water spray is produced within the incubation chamber which has the effect of raising the relative humidity within the chamber.

On either side of the divider and extending from the front to the rear of the incubation chamber are heat exchangers 30, 32. These are devised to heat the air circulated within the incubation chamber.

Shown at 34 is a powered fan unit, including a fan. With operation of the fan unit, air is caused to move upwardly against the atomizer to force the water spray upwardly through the heat exchangers and around the incubating chamber generally in the direction of the arrows shown in the drawing.

Illustrated at 40 and 42 are openings which connect the incubating chamber with the area outside the incubating chamber. Normally this would be within an enclosure with air in the enclosure typically having a temperature and relative humidity of normal atmospheric air, for instance a temperature of 60° F. and 50% relative humidity. During the passage of time, some outside air circulates into the incubating chamber, which has the effect of lowering the relative humidity. To raise the relative humidity to the level desired the atomizer described is actuated. Frequently during the later stages of incubation, to lower the carbon dioxide content of the air within the incubating chamber, air from the outside is circulated through the incubating chamber utilizing a powered fan or other powered means. Such fan means has not been shown in the drawing.

Figure 2:
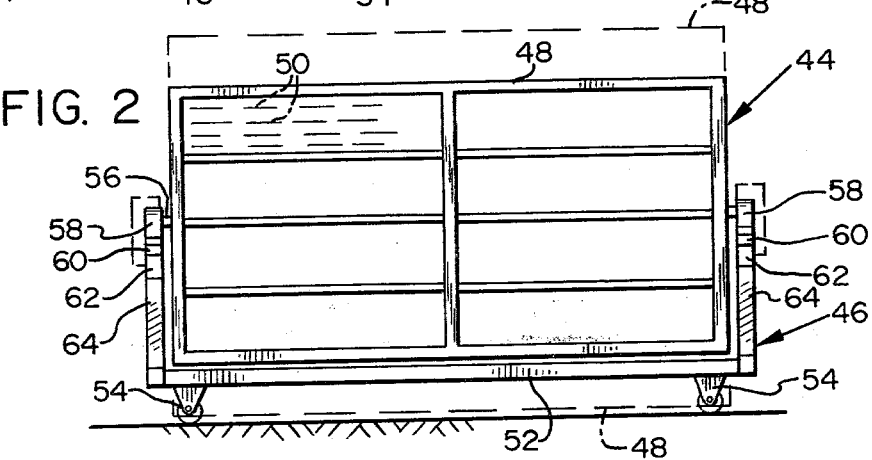
FIG. 2 is a side view of means provided in the facility for supporting eggs during the incubation cycle.

During incubation, eggs are lodged within the incubation chamber utilizing one or more racks 44, each mounted on a mobile stand 46. Specifically, two of such racks and stands are illustrated in FIG. 1, side-by-side within the incubation chamber. One is illustrated in side elevation in FIG. 2. Each rack comprises an elongate rectangular framework 48. The framework supports within it tiers of incubator egg trays such being partially indicated in FIGS. 1 and 2 by the dashed lines 50. It should be understood that these tiers of egg trays take up the entire space within the rectangular framework of a rack. Egg trays such as might be utilized in supporting the eggs are described in detail in Cannon U.S. Pat. Nos. 3,470,851 and 3,489,124. The trays in general are of an open framework construction, accommodating the circulating of air through the rack and over the eggs.

Each rack is supported on a stand 46 which includes a base 52 and casters 54 rollingly supporting the stand. Each rack has the extremities of a shaft 56 projecting from the ends thereof and these shaft extremities are journaled in bearings such as the bearing shown at 58. This permits the entire rack to be rotated about the axis of shaft 56, which permits the eggs to be repositioned periodically within the chamber, whereby to invert them, etc.

As contemplated by this invention, the means for supporting the eggs within the incubating chamber includes a weight-sensing means which is sensitive to the weight of the eggs supported by the stand 46. Thus, shown at 60 is a strain gauge load cell which is interposed between bearing 58 and a pedestal portion 62 which forms part of the stand and which is supported above the base of the stand by A-framework 64. The load cell, as is conventional, includes a flexural element interfaced with an electrical bridge network. Weight on the load cell produces an imbalance in the electrical bridge resulting in an electrical signal output directly proportional to the amount of weight or strain exerted against the load cell. While a load cell could be incorporated at each of the opposite ends of the rack where such is supported on the stand, it has been found that it is sufficient to provide load cell support for one end of the rack only, such being effective to give a measurement proportional to the egg weight supported within the rack.

Generally describing the method of the invention and how the apparatus illustrated can be used in performing the method, turkey eggs, by way of example, are subjected to an incubation period or cycle of 25 days, after which they are removed from the incubator and transferred to the hatchery area. It has been observed that good incubation results are obtained if the so-called dry-down, i.e., the percent loss of weight in these eggs, at the end of the 25 day incubation period, is 13.5%. Furthermore, good results are obtained if the dry-down, expressed as a percentage of original egg weight, is at a uniform rate throughout this 25-day period. With these conditions, when the percent dry-down based on the original egg weight is plotted against the incubation days, targeted dry-down would appear as the solid line appearing in the graph shown in FIG. 7, the percent dry-down increasing at a linear rate throughout the 28 day period.

As contemplated by the invention, the amount of dry-down which has occurred in the eggs is periodically monitored, for instance, on a daily basis. Weight sensing means or load cell 60 is utilized to indicate the initial egg weight supported by the rack (the weight of the rack and the trays is constant and known). Egg weight on a daily basis is obtainable from the weight-sensing means so that the dry-down on any given day is readily determinable by subtracting from the initial weight ($E_O$) the new egg weight or the egg weight on the given day ($E_n$). The percent dry-down which has occurred is determinable by the following equation (where DD is dry-down): $DD = (E_O - E_n)/E_O \times 100$ Targeted dry-down on any given day may be determined by reading the plot set forth in FIG. 7. It also may be computed by the following equation ($DD_t$ being targeted dry-down):

$$DD_t = \frac{\text{days in incubation}}{25} \times \text{total targeted dry-down (or 13.5)}.$$

If the dry-down indicated by the weight-sensing means on any given day is less than that which is desired to obtain (the targeted dry-down), the relative humidity within the incubator is lowered and conversely, if the dry-down is more than that desired, the relative humidity within the incubator is raised.

Figure 7:
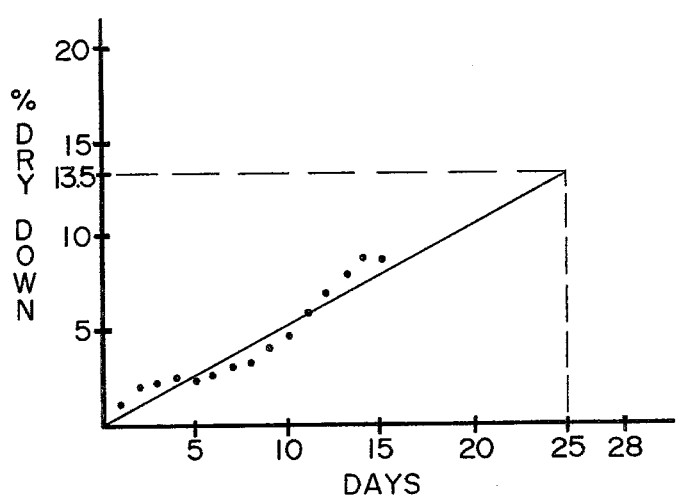
FIG. 7 is a chart illustrating during the initial phase of an incubation cycle actual dry-down in a typical case in relation to targeted dry-down.

It has been found by experience that turkey eggs will have a dry-down approximating the targeted dry-down indicated in the chart of FIG. 7 if the eggs during the initial days of incubation are maintained at a relative humidity of about 58. During later stages of the incubation period, a lower relative humidity of approximately 54 or 56 is preferable. In the plot which forms FIG. 8, a targeted relative humidity has been charted and is shown by the solid line. The targeted relative humidity is approximately the relative humidity conditions that should be maintained during the incubation period to have the targeted dry-down in FIG. 7.

Figure 8:
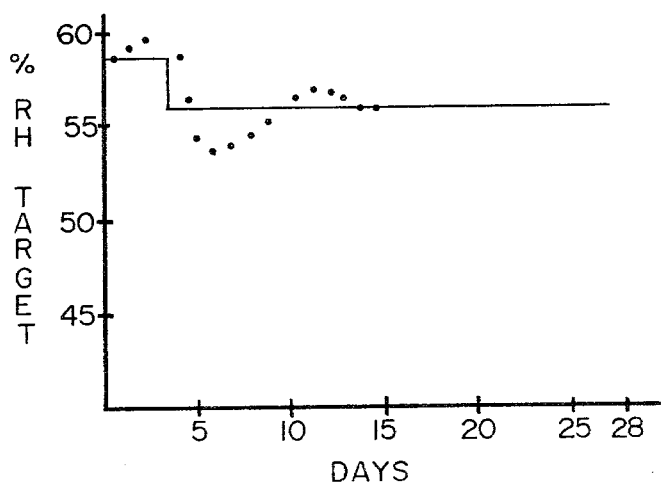
FIG. 8 is a chart illustrating targeted and actual relative humidity present in an incubation chamber typical of an incubation cycle.

In making necessary humidity changes to obtain a dry-down which approaches the dry-down targeted, it has been found desirable to have a relative humidity in the incubator which proceeds on the targeted level, as shown in FIG. 8, making variations from the targeted level, either upwardly or downwardly, depending upon the actual dry-down which has occurred. A convenient way to make such a humidity adjustment is to obtain the difference, on a daily basis between the actual percent dry-down that has occurred, and the percent dry-down which is targeted. The relative humidity within the chamber is then biased upwardly or downwardly from the targeted relative humidity by an amount related to this difference. It has been found convenient to determine the adjustment that is made by multiplying the difference between the two percents obtained by a so-called gain factor, such as 5. Thus, if the difference in the actual and targeted percent dry-down on any given day is 0.75, with actual percent dry-down exceeding targeted percent dry-down by that amount, on that day a relative humidity change is made of 0.75×5, or 3.75%, with the adjustment being a raising of the relative humidity within the chamber by this amount.

Further explaining, a load of eggs deposited within an incubator rack as shown in FIG. 1 was calculated to have a weight of 2,560 lbs. On intially being placed in the incubator chamber, the relative humidity within the incubator chamber was established at 58 and the temperature at 99.6° F. On a daily basis the weight of the eggs in the rack was determined using the sensing means or load cell 60. The percent dry-down obtained on a daily basis is indicated by the dots set forth in the chart forming FIG. 7.

Adjustments were made in the relative humidity within the incubator by determining on each day the difference between the total actual percent dry-down which had thus far occurred, and the percent dry-down which was targeted. This difference was multiplied by a gain factor of 5. Relative humidity within the incubator was then biased upwardly or downwardly by this amount. The dots set forth in the chart of FIG. 8 indicate relative humidity settings made on a daily basis.

FIGS. 7 and 8 indicate conditions during the first 15 days of incubation. It will be noted that with the procedure the percent dry-down may be closely controlled to follow the targeted dry-down. The procedure outlined is continued until the full 25 days of incubation is completed.

Figure 3:
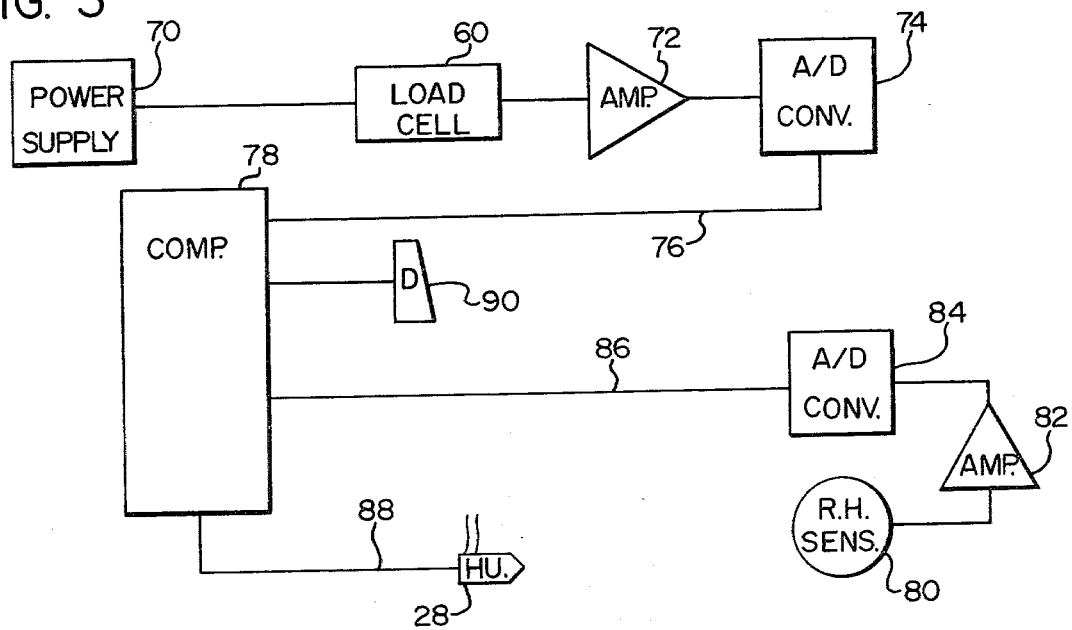
FIG. 3 illustrates schematically a control system wherein the measurements produced by the weight-sensing means are effective to regulate humidity within the incubating chamber.

FIG. 3 illustrates schematically a system whereby measurements produced by the sensing means or load cell are utilized in controlling humidity automatically. Referring to the figure, a power supply 70 delivers a low excitation voltage to the load cell shown at 60. The load cell in turn delivers a signal to a bridge amplifier module 72 proportional to the weight sensed by the cell. This signal is delivered to an analogue to digital converter 74 producing in conductor 76 a digital output proportional to the weight sensed by the load cell which output is delivered to a computor 78.

Shown at 80 is a relative humidity sensor which produces an output signal proportional to the relative humidity within the incubator chamber. The signal of this sensor is delivered to an amplifier 82 and to another analogue to digital converter 84 producing a digital output supplied to computor 78 through conductive 86. Computor 78 provides a signal through conductor 88 to humidifier 28 whereby the humidifier is controlled.

At the start of the incubation cycle, the computor is programmed to control relative humidity in accordance with a targeted relative humidity, such as the targeted relative humidity portrayed in FIG. 8. The computor is also programmed with a targeted percent dry-down profile, as set forth by the solid line in FIG. 7. During the first 24 hours of operation, the humidity within the incubating chamber is maintained at the targeted humidity.

At the end of a 24 hour period, the actual dry-down which has occurred in the eggs is sensed by the sensor or load cell and this information is fed to the computor which compares actual percent dry-down with the targeted percent dry-down. Where targeted and actual dry-down differ, an appropriate signal is produced in the computor and sent to the atomizer or humidifier 28 which maintain the relative humidity in the chamber for the next 24 hour period at a level biased from targeted relative humidity in the manner earlier described.

At 90 there is shown a display from which information supplied by the computor can be visually ascertained.

From the above description it should be clear that a method and apparatus is contemplated which promotes the obtaining of uniform hatch results through the continuous monitoring of the dry-down which has occurred in the eggs being incubated. Weight loss occurring in the eggs is directly proportional to the dry-down and this information may be utilized to produce on a periodic basis adjustments in relative humidity which promote the obtaining of a dry-down rate conforming to a targeted dry-down rate. There is no necessity to sample individual eggs from the incubator, which normally requires opening the incubator and visually handling the egg, i.e. examining it under light to determine how embryo formation and dry-down has proceeded.

It is claimed and desired to secure by Letters Patent:

1. In the incubation of eggs where eggs are stored under a controlled atmosphere, the method comprising:
   during the incubating of the eggs periodically making weight indicative measurements of the dry-down which has occurred in the eggs, and
   adjusting the relative humidity of the atmosphere under which the eggs are stored to produce a change in the rate of dry-down when the weight indicative measurements indicate the dry-down rate differs from a predetermined dry-down target rate.

2. The method of claim 1, wherein the relative humidity of the atmosphere under which the eggs are stored is increased where weight indicative measurements indicate a dry-down exceeding the targeted dry-down and is decreased where weight indicative measurements indicate a dry-down less than the targeted dry-down.

3. In the incubating of eggs, the method comprising:
   supporting the eggs during the incubation period in weight-sensitive means which renders measurements indicative of egg weight,
   creating a controlled atmosphere about the eggs conducive to egg incubation,
   at least periodically obtaining measurements from said weight-sensitive means,
   and adjusting the relative humidity of the atmosphere in response to weight measurements obtained by said weight-sensitive means.

4. The method of claim 3 wherein the relative humidity of the atmosphere is increased where weight measurements indicate a dry-down exceeding a targeted dry-down for the eggs, and is decreased where weight measurements indicate a dry-down which is less than the targeted dry-down.

5. Apparatus for incubating eggs comprising:
   an incubating chamber,
   a rack within said chamber for holding incubating egg trays with the trays arranged as tiers within the rack,
   means supporting the rack above the base of the chamber,
   said means including weight-sensing means constructed and arranged to produce a measurement indicative of the weight of the eggs carried by the trays supported on said rack, and
   means for adjusting the relative humidity in said chamber responsive to the measurement produced by said weight-sensing means.

6. The apparatus of claim 5, wherein the means for supporting the rack above the floor of said chamber includes a stand, the rack has opposed, horizontally spaced ends, and means to support each of said ends on said stand, the means supporting at least one end of said rack on said stand including said weight-sensing means.

7. The apparatus of claim 6 wherein each of said means supporting an end of said stand rotatably supports said end for rotation of the rack about a horizontal axis, and said means supporting at least one end of said rack comprises a bearing and a load-cell interposed between said bearing and said stand.

* * * * *